May 20, 1930.        M. HART        1,759,398
EGG HOLDER
Filed Jan. 10, 1928
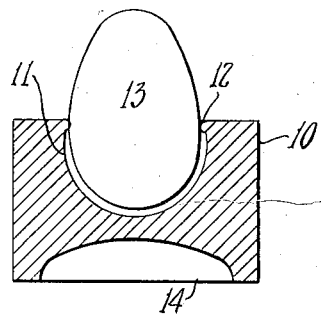
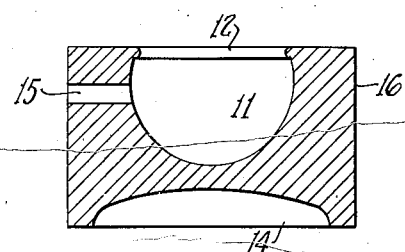
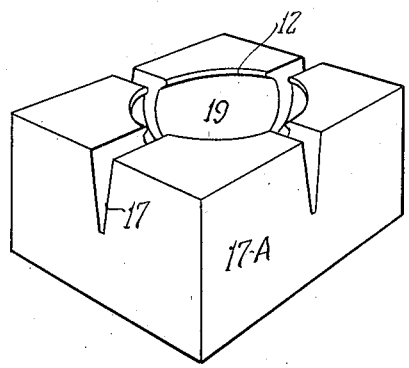
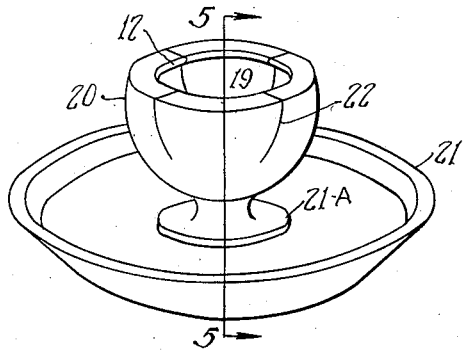
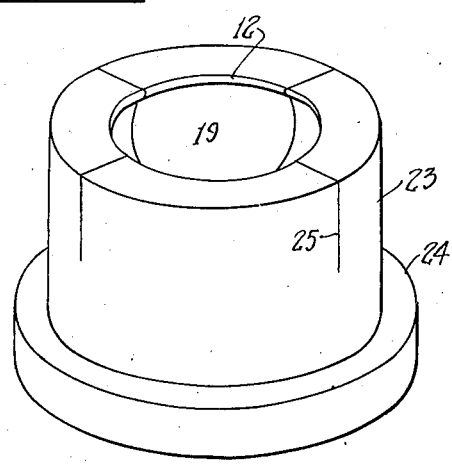
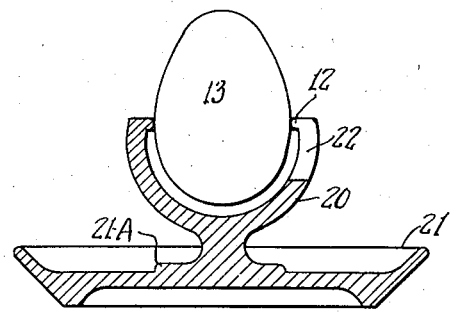
INVENTOR
M. Hart
BY C. B. Birkenbeuel
ATTORNEY Patented May 20, 1930

1,759,398

UNITED STATES PATENT OFFICE

MARJORIE HART, OF VANCOUVER, WASHINGTON

EGG HOLDER

Application filed January 10, 1928. Serial No. 245,730.

This invention relates generally for devices for holding eggs and particularly to devices constructed of rubber.

The main object of this invention is to provide an exceedingly simple and efficient form of egg holder which will securely hold eggs of varying sizes against movement on a plain surface or against being easily overturned, and for holding an egg while hot.

These, and other objects, will become more apparent from the specification following as illustrated in the accompanying drawing, in which:

Figure 1 is a transverse section through the device showing same holding an egg. Figure 2 is a section through a modified form of the device in which is incorporated a suction control opening. Figure 3 is a perspective view of the third form of the device having V-shaped slots formed therein. Figure 4 is a perspective view of the fourth form of the device having a round base and employing narrow slits in the cup section. Figure 5 is a section taken along the line 5—5 in Figure 4. Figure 6 is a perspective view of still another modification of the device.

Similar numbers of reference refer to similar parts throughout the several views.

Referring in detail to the drawing, in Figure 1 is shown a cup 10 having a recess 11 formed therein around the upper edge of which is formed an inturned rim 12 adapted to engage an egg 13. The under side 14 is preferably recessed to improve its stability by allowing the cup to rest principally upon its outer edges or if desired to employ the suction cup principle for holding same in place, as on board ship or on moving vehicles. In this instance the egg 13 engages the rim 12. The entire cup stand is made of rubber which is cured to a degree of flexibility which will allow any ordinary size egg to be placed therein.

In the form shown in Figure 2 the device is identical with that shown in Figure 1, except that an opening 15 is provided in the side of the cup 16.

In Figure 3 are introduced the V-shaped slots 17 permitting greater collapsing of the holder 17—A for the purpose of grasping a small egg, and at the same time allowing the outer portion of the cup to expand to take care of the large egg. Whereas in the form shown in Figure 4 where slits 22 are employed, instead of actual slots, the cup 20 is only capable of expanding by bending the material in the cup. It is not capable of collapsing in the sense that the device shown in Figure 3 is capable of. In the form shown in Figure 4 the base 21 is preferably in the form of a saucer which is integral with the sub-base 21—A of the cup 20.

In the form shown in Figure 6 the cup 23 is cylindrical and the base 24 is merely a slightly enlarged flange. In this form of the device slits 25 extend through the side walls of the cup 23 into the recess 19.

The numeral 11 has been applied to the recess providing suction for holding the egg 13, and the numeral 19 has been applied to those recesses which are connected with the exterior of the cup by means of slots or slits.

One of the outstanding advantages of this device is its great convenience in the handling of hot eggs, both for the purpose of cutting or removing their shells, or holding same while eating.

I am aware that egg holders made of metal, wood and porcelain have been constructed in the past, I, therefore, do not intend to cover such devices broadly but intend to cover only such forms and modifications as fall fairly within the limits of the following claim. Whereas this device has been described as applying to egg holders, it is obvious that it will be equally useful for holding other objects, such as grapefruit, oranges, etc. while being eaten.

I claim:

An egg cup comprising a resilient rubber body having its bottom shaped to hold the body in an upright position when the body is resting on a horizontal supporting surface, said body having a substantially spherical cavity, the mouth of which opens at the top of the body, and an inwardly extending annular flange integral with the body, arranged at the mouth of said cavity and defining an opening in the top of the body of less diameter than any horizontal diameter of the cavity at its largest portion, for the purpose of grasping the upper portion of an egg seated in said cavity.

MARJORIE HART.